United States Patent Office 3,489,379
Patented Jan. 13, 1970

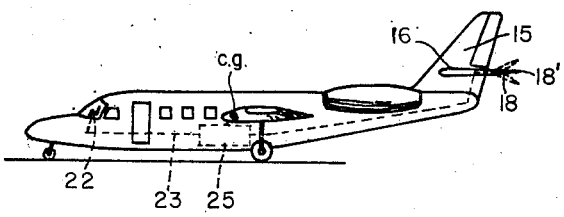
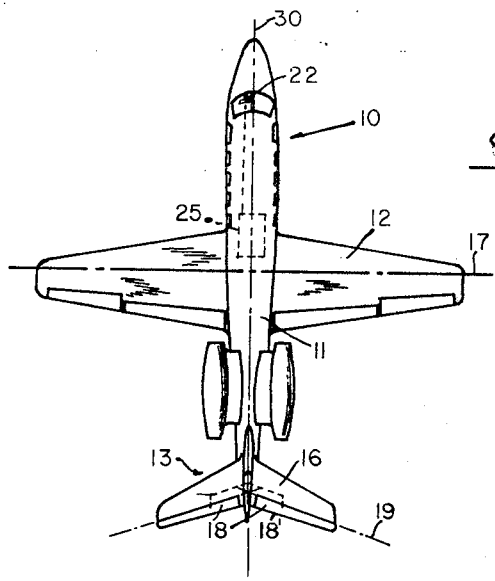
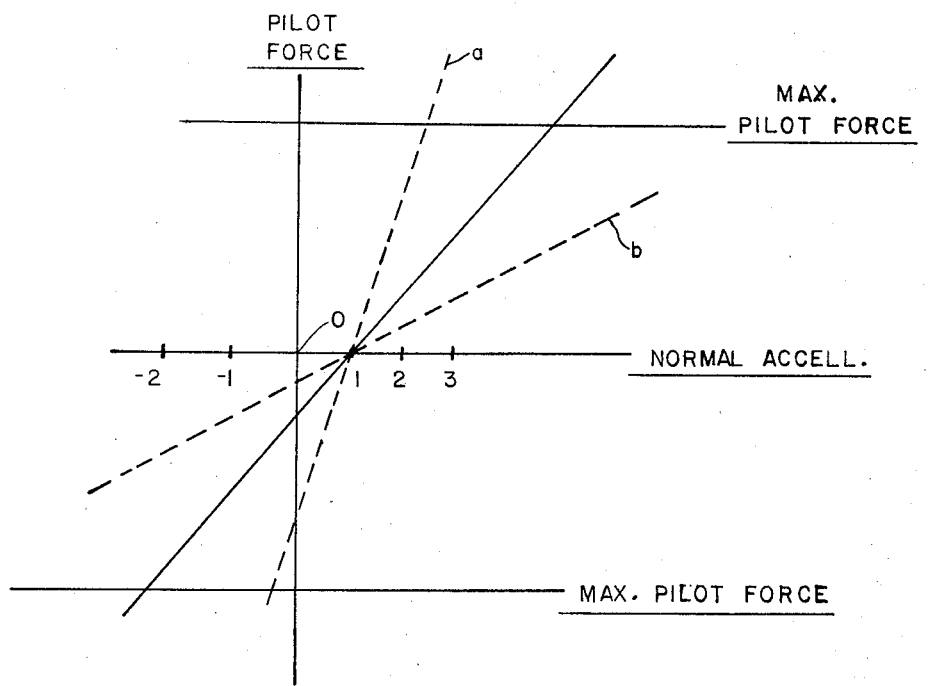

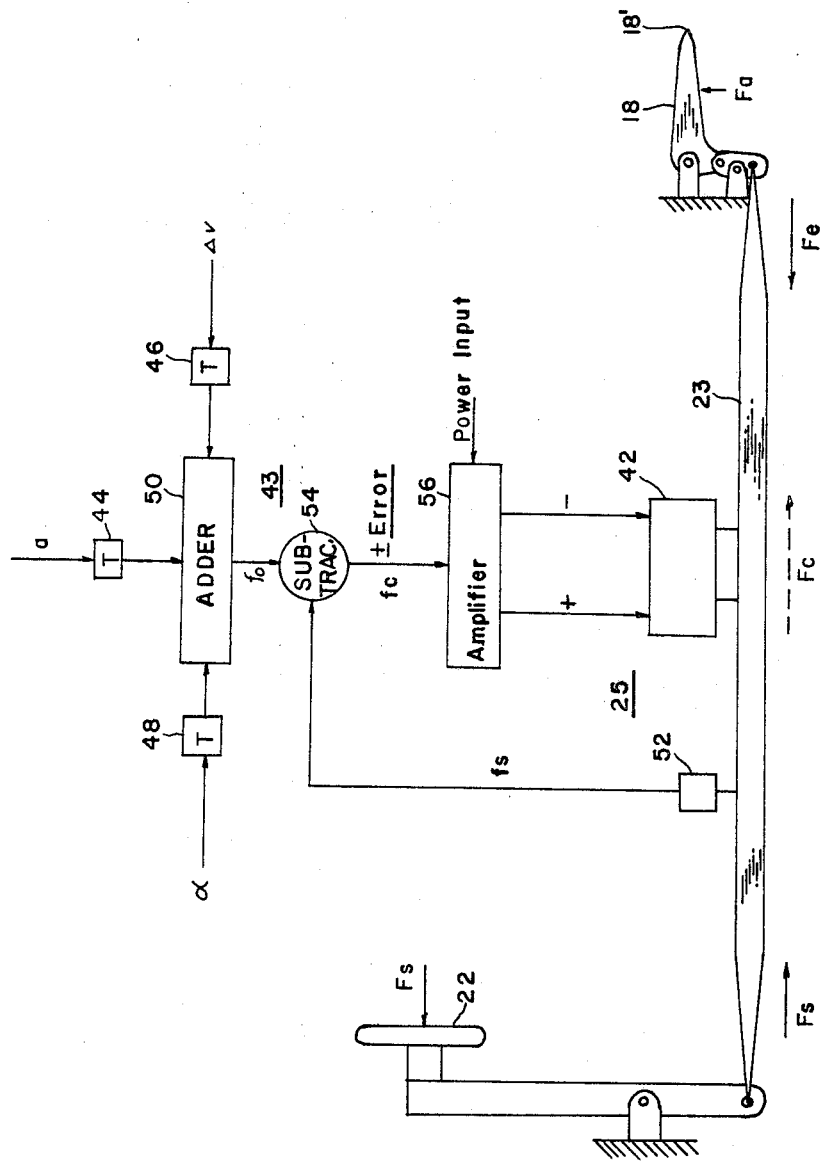

3,489,379
STICK FORCE OPTIMIZER
Bill B. Bogart, 5124 S. Richmond St.,
Tulsa, Okla. 74101
Filed Mar. 20, 1968, Ser. No. 718,304
Int. Cl. B64c 13/04
U.S. Cl. 244—83                                19 Claims

ABSTRACT OF THE DISCLOSURE

A control system for controlling the pilot produced force required to position an aircraft control surface in accordance with external operating conditions, the control system comparing the actual pilot produced force required to position the control surface with an optimum pilot produced force corresponding to the external operating conditions and generating a corrective force to adjust the actual pilot produced force such that it is substantially identical to the optimum pilot produced force.

---

The invention relates to systems for controlling the attitude of aircraft and, more particularly, to a control system for optimizing the pilot produced force required to position an aircraft control surface.

To control the attitude of an aircraft in flight, it is essential that the aircraft have variable control surfaces. Of these control surfaces, the elevators, which generally are horizontally disposed control surfaces on the tail section, are of prime importance since they control the aircraft's attitude about its lateral axis. Except in certain military aircraft in which the elevators and other control surfaces are positioned by irreversible power apparatus which provides no direct connection between the pilot's control stick and the control surface, the control system for positioning the elevators usually includes a direct and fully reversible mechanical coupling between the pilot's control stick and the elevator for directly and precisely positioning the control surface in accordance with the position of the control stick. Under ideal conditions, the force required of the pilot to change or maintain the control surface position will vary in a predictable manner with reference to various external operating conditions such as normal acceleration, changes in air speed, angular acceleration, and the positions of ancillary equipment such as flaps, landing gear, etc. The force gradient, or change in the required force with changes in external operating conditions, provides the pilot with a "feel" of the operating conditions and the reaction of the aircraft to such conditions. The force gradient should, of course, be independent of internal aircraft conditions so that the "feel" transmitted to the pilot through the control stick will give a true indication of the external conditions. Unfortunately, however, it has been found that control systems generally are extremely responsive to changes in the aircraft center of gravity. Accordingly, in aircraft having state-of-the-art control systems, the pilot's "feel" is likely to change significantly from flight to flight even when the external conditions are unchanged since the location of the center of gravity and the aircraft gross weight will vary with different loadings.

Turning attention now to the force gradient itself, it will be appreciated that for maximum "feel" the gradient should be as large as possible so that the pilot will be able to detect small changes in the external operating conditions. On the other hand, the force gradient should not be so large that the forces required of the pilot under large, but reasonably expected, changes become greater than the pilot is physically capable of providing with reasonable comfort. At this point, it will be apparent to those skilled in the art that an ideal control system for positioning the elevators of an aircraft would be (1) substantially insensitive to internal aircraft conditions such as the location of the aircraft center of gravity and its gross weight, and (2) characterized by a relative steep force gradient in which the force requirements reach, but do not exceed, the pilot's comfortable force capabilities at the largest expected changes in the external operating conditions.

It is therefore an object of this invention to provide an improved control system for positioning variable position elements such as aircraft control surfaces.

Another object is to provide an aircraft control system for optimizing the pilot produced stick force required to position the elevators of the aircraft.

Still another object of this invention is to provide an aircraft control system for positioning the aircraft's elevators which is substantially insensitive to internal aircraft conditions, including the location of the center of gravity.

A further object is to provide an aircraft control system for positioning the aircraft's elevators in which the stick force gradient is such that the force requirements reach, but do not exceed, the pilot's maximum comfortable force capabilities at the largest expected changes in external operating conditions.

Briefly stated, in carrying out the invention in one form, an aircraft control system for controlling the position of a variable control surface such as an elevator includes mechanical means for directly and reversibly interconnecting the pilot's control stick and the control surface and force producing and controlling means for exerting a corrective force on the mechanical means. The force producing and controlling apparatus compares the actual pilot produced force on the mechanical means with a computed optimum pilot produced force corresponding to the then existing external operating conditions and generates a corrective force having a magnitude and direction such that the actual pilot produced force is adjusted so as to be substantially identical to the optimum pilot force. In accordance with a preferred embodiment of the invention, the force producing and controlling apparatus is responsive to normal acceleration, changes in air speed and angular acceleration.

By a further aspect of the invention, the force producing and controlling apparatus includes a double-acting fluid actuator for actually exerting the corrective force on the mechanical means and a closed-loop servo control system including a servo valve for continuously and variably controlling the direction and the magnitude of the corrective force by controlling the flow of an actuating fluid to the fluid actuator. By a still further aspect of the invention, the servo control system comprises a mechanical linkage including a balance member subject both to forces proportional to an optimum pilot force for the then existing external operating conditions and to forces proportional to the actual pilot force, the net effect on the balance member being proportional to a desired corrective force. The balance member is connected to the servo valve such that the fluid actuator exerts an actual corrective force equal to the desired corrective force.

While this specification concludes with claims particularly pointing out and distinctly claiming the subject matter forming the invention, the invention, together with further objects and advantages, may best be understood by reference to the following description taken in conjunction with the accompanying drawings in which:

FIGURE 1 is a plan view of an aircraft having elevators positioned by the control system of this invention;

FIGURE 2 is a side elevation view of the aircraft of FIGURE 1;

FIGURE 3 is a plot illustrating the relationships between the required pilot produced force to position the elevators, the optimum pilot produced force, and a typical external operating condition;

FIGURE 4 is a schematic illustration of the control system of this invention.

Figure 5:
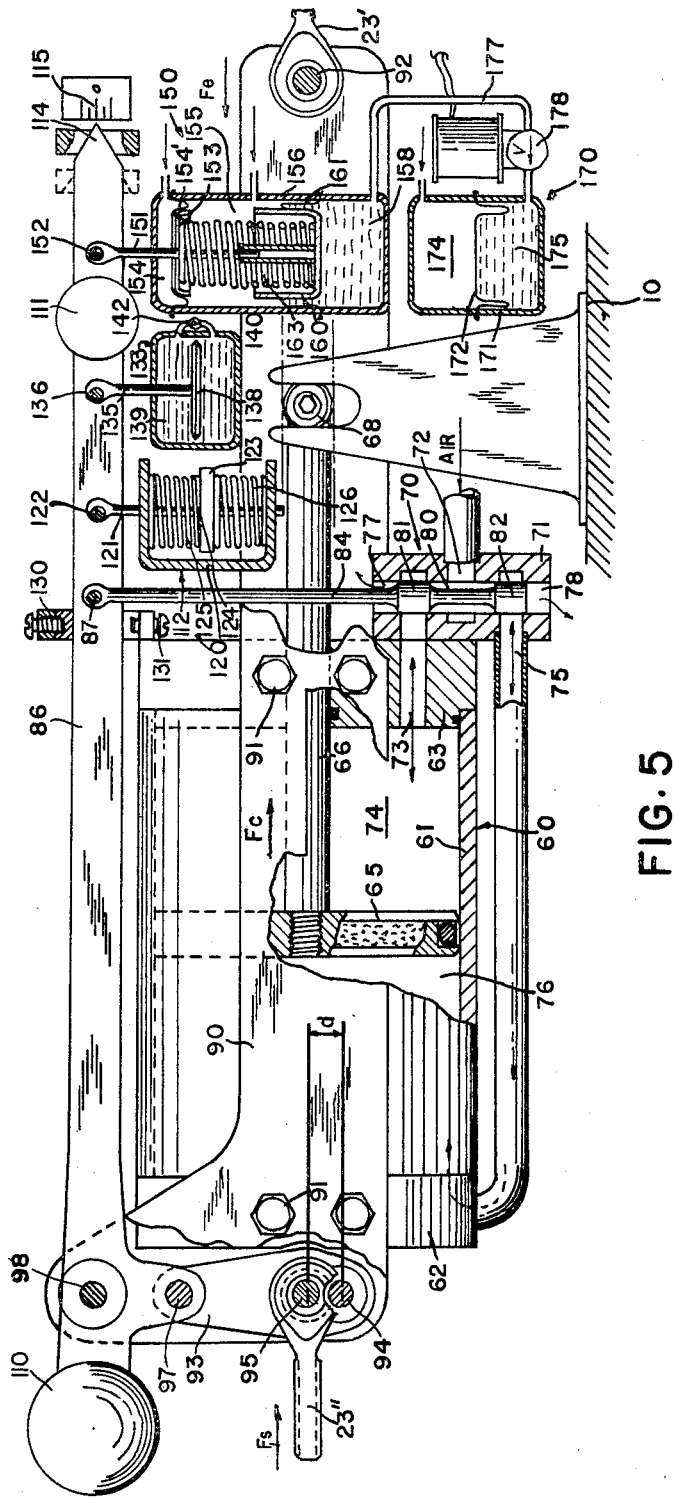
FIGURE 5 is a view, partially schematic and partially in cross-section, of a mechanical embodiment of the invention.

Referring first to FIGURES 1 and 2, an aircraft 10 is illustrated, the aircraft including a fuselage 11, a pair of wings 12 mounted on opposite sides of the fuselage 11 and projecting laterally therefrom, a tail assembly 13, and a pair of jet propulsion powerplants 14 symmetrically mounted on opposite sides of the fuselage 11 intermediate the wings 12 and the tail assembly 13. The tail assembly 13 includes a vertical stabilizer 15 and a pair of horizontal stabilizers 16 projecting laterally from opposite sides of the vertical stabilizer 15. To control the attitude of the aircraft 10 about its lateral axis 17, each of the horizontal stabilizers 16 has an elevator 18 pivotally secured thereto about a lateral axis 19. By means of a control stick 22 and a direct mechanical connection 23 (both being illustrated by broken lines in FIGURES 1 and 2), the pilot is able to position the elevators 18 in unison to control the attitude of the aircraft 10 relative to its lateral axis 19. In accordance with the present invention, a force producing and controlling device 25 is provided for exerting a corrective force on the mechanical connection 23 to either help or oppose the pilot, the direction and magnitude of the corrective force depending upon the actual pilot produced force required to position the elevators 18 and a computed optimum pilot force which should be required under the then existing external operating conditions. More particularly, the corrective force is such that the actual pilot produced force is adjusted so as to be substantially identical to the computed optimum pilot force. The manner in which the proper corrective force is generated and applied to the mechanical connection 23 by the control system of this invention will become apparent as this specification proceeds.

Before turning attention to the control system of this invention, however, it will be well to review briefly the aerodynamic function of the elevators 18. During level flight at a constant air speed, the elevators 18 of a trimmed aircraft 10 will be substantially horizontal, and there will be no external forces acting on the elevators 18 to move the elevators 18 out of their equilibrium position. Consequently, under these conditions, the pilot can maintain the elevator position without applying any force to the control stick 22. If, however, the airspeed of the aircraft 10 is changed from the airspeed for which the aircraft is trimmed, external aerodynamic forces will be applied on the elevators 18, and the pilot will have to exert an opposing force on the control stick 22 in order to maintain the horizontal position of the elevators 18 and the changed speed. For example, an increase in airspeed will result in aerodynamic forces tending to raise the trailing edges 18' of the elevators 18. Unless the pilot exerts an opposing force on the control stick 22 to maintain the horizontal position of the elevators 18, this will cause the aircraft 10 to rotate in a clockwise direction as viewed in FIGURE 2 until its speed returns to the trim speed. At this point, it should be noted that the manner of rotation of the aircraft 10 provides an advance indication that the airspeed will be subsequently returning to its trim speed. This anticipation provided by the angular pitch acceleration of the aircraft is an important factor which will be returned to presently for greater discussion.

Normal acceleration, which is defined to be acceleration acting perpendicular to the plane containing both the longitudinal and lateral axes 30 and 17 respectively of the aircraft 10, is another major operating condition which affects the external loading of the elevators 18. More particularly, positive normal accelerations greater than one $g$, which is the normal acceleration due to gravity, are accompanied by external forces tending to lower the trailing edges 18' of the elevators 18, and negative normal accelerations and positive normal accelerations of less than one $g$ are accompanied by external forces tending to raise the trailing edges 18'. Again, the pilot must exert opposing forces in order to prevent rotation of the aircraft 10 until the normal acceleration returns to a positive one $g$ condition. Similarly, angular pitch accelerations of the aircraft 10 in a clockwise direction as viewed in FIGURE 2 will be accompanied by external forces tending to lower the trailing edges 18', and angular pitch accelerations in a counter-clockwise direction will be accompanied by external forces tending to raise the trailing edges 18'.

As indicated previously, the location of the aircraft center of gravity is an internal operating condition which has a significant effect on the force required to maintain or change the position of the elevators 18. Thus, if the pilot is permitted to "feel" the actual forces required to position the elevators 18, his "feel" for the external conditions is accurate only when the actual center of gravity and the design center of gravity are coincident. FIGURE 3 illustrates how the pilot's force requirements can vary with changes in center of gravity for one external operating condition, normal acceleration. With the actual center of gravity coincident with the design center of gravity, the pilot's force requirements for various normal accelerations would follow the path illustrated by the solid line, a positive force requirement existing when the pilot is required to push on the control stick 22 to lower the trailing edges 18' and a negative force requirement existing when the pilot is required to pull on the control stick 22 to raise the trailing edges 18'. The force gradient in this situation is sufficiently steep to give the pilot a clear indication of changes in normal acceleration, but the force requirements do not exceed his comfortable strength capabilities at the maximum expected normal accelerations of positive three $g$'s and negative one $g$. In other words, the force requirements are optimized at the design center of gravity. If, however, the actual center of gravity is moved forward of the design center of gravity, the pilot's force requirements will, in the absence of the present invention, assume a steeper slope such as that illustrated by the broken line $a$. In such a case, the pilot still has an acceptable "feel" for changes in external operating conditions, but his comfortable force capabilities will be exceeded at relatively low normal accelerations. On the other hand, if the actual center of gravity is moved back of the design center of gravity, the pilot's force requirements will assume a lesser slope such as that illustrated by the broken line $b$. In such a case, the pilot will not have a good "feel" for the external operating conditions because of the low force gradient.

By means of the present invention, a corrective force is exerted by the force producing and controlling device such that the pilot's actual force requirements follow the optimum schedule indicated by the solid line for all center of gravity locations. Thus, when the actual center of gravity is forward of the design center of gravity, the control system will help the pilot by reducing the force requirements against which he must work to the optimum requirements. Similarly, when the actual center of gravity is aft of the design center of gravity, the control system will oppose the pilot by increasing the force requirements against which he must act to the optimum requirements.

The control system of this invention will now be described with reference to the schematic illustration of FIGURE 4. The force producing and controlling apparatus 25 includes a suitable actuator 42 and a closed-loop servo control system 43. The servo system 43 includes a transducer 44 for sensing normal acceleration and producing a signal indicating an optimum pilot force for the sensed normal acceleration, a transducer 46 for sensing changes in airspeed from a trim speed and producing a signal indicating an optimum pilot force corresponding to the change in airspeed, and a transducer 48 for sensing angular pitch acceleration and producing a signal indicating an optimum pilot force corresponding to the angular pitch acceleration. The output signals from the transducers 44, 46 and 48 are combined in an adder 50, which produces an output signal $f_o$ which indicates the net optimum pilot produced force corresponding to the sensed conditions taken together. It should be noted that the signals from the transducers 44, 46 and 48 may cancel each other in the adder 50. For example, signals resulting from positive normal acceleration and increases in airspeed have different directions and may cancel each other in the event that they occur simultaneously. Similarly, it was indicated earlier that angular pitch acceleration introduces a certain amount of anticipation into the system. To explain, let it be assumed that the airspeed is increased and that an aerodynamic force $F_a$ is exerted on the elevator 18 which actually raises the elevator 18 and causes the nose of the aircraft to pitch upward. The change in airspeed would indicate through the transducer 46 an optimum pilot force component to oppose the aerodynamic force $F_a$ due to the change in airspeed. However, the positive angular acceleration existing as the nose started to pitch upward would indicate through the transducer 48 an optimum pilot force component due to angular pitch acceleration opposed to the optimum force due to the change in airspeed. As a result, the corrective force actually applied is modified to anticipate the return of the airspeed to the trim speed, and overshooting of the actual airspeed to a value less than that of the trim speed will be largely prevented. Other anticipatory signals could alternatively be used, one such indication being airspeed rate of change.

Continuing now with a description of the closed-loop servo control system 43, a transducer 52 senses the actual pilot produced force $F_s$ required to position the elevators 18, and the transducer 52 produces a signal $f_s$ proportional to the actual force. The output signals from the adder 50 and the transducer 52 are supplied to a subtractor 54 in which the optimum force signal is subtracted from the actual force signal, the output signal from the subtractor 54 being an error signal $f_c$ proportional to the proper corrective force. This error signal is then supplied to an amplifier 56 which controls the power input to the actuator 42 such that the actuator 42 produces a corrective force $F_c$ on the mechanical means 23 to help the pilot when the actual required force is greater than the optimum force and to work against the pilot when the actual required force is less than the optimum force. Since, of course, the closed-loop servo system 43 acts continuously and instantaneously to vary the corrective force $F_c$ in accordance with the sensed external conditions and the actual pilot force $F_s$, it will occur to those skilled in the art that the actual pilot force $F_s$ will at all times be very close in magnitude to the optimum force.

As an illustration, let it be assumed that the external and internal operating conditions are such that an actual force $F_A$ is exerted on the elevators 18 in a direction to raise their trailing edges 18'. As a result, the elevators 18 will exert a force $F_E$ on the mechanical means 23 directed to the left, and this actual force $F_E$ will be opposed by the actual pilot force $F_s$ as varied by the corrective force $F_c$. Simultaneously, the external operating conditions will be sensed and added in the adder 50 to produce a net optimum pilot force signal $f_o$ proportional to an optimum pilot force. If the actual pilot force $F_s$ has a magnitude greater than the optimum pilot force, the magnitude of the signal $f_s$ will be correspondingly greater than the signal $f_o$, and the output signal $f_c$ from the subtractor 54 will be a positive error signal $f_c$ proportional to the proper corrective force $F_C$. The amplifier 56 will receive this positive error signal $f_c$, and it will cause the actuator 42 to apply the proper corrective force $F_C$ to the mechanical means 23 to help the pilot by reducing his actual control stick force $F_s$ to a value corresponding to that called for by the signal $f_o$.

A mechanical embodiment of the control system of this invention is illustrated by FIG. 5. The force producing apparatus is a double-acting fluid actuator 60 including a cylinder 61 closed at its opposite ends by cylinder heads 62 and 63, a piston 65 positioned within the closed cylinder 61, and a piston rod 66 extending from the piston 65 through the cylinder head 63 to a connection 68 where it is maintained in a normally fixed position relative to the aircraft 10. An actuating fluid such as pressurized air or hydraulic fluid is selectively supplied to opposite sides of the piston 65 by a four-way servo valve 70 including a housing 71 having a center inlet 72 for admitting the actuating fluid, a first outlet 73 communicating with the closed space 74 on the right side of the piston 65, a second outlet 75 communicating with the closed space 76 on the left side of the piston 65, and a pair of drain outlets 77 and 78 communicating with the atmosphere. A slidable valve element 80 having spaced apart pistons 81 and 82 thereon is disposed within the housing 71, the valve element 80 being positioned by a rod 84 pivotally connected to a balance beam 86 at 87. As illustrated, the balance beam 86 is in a null position, and the valve element 80 is in a corresponding null position with the pistons 81 and 82 blocking the outlets 73, 75, 77 and 78 to prevent any flow of actuating fluid. If, however, the balance beam 86 is displaced downwardly at 87, the pistons 81 and 82 will also be displaced downwardly, and actuating fluid will flow to the space 76 through the inlet 72 and the outlet 75 and will be discharged from the space 74 through the outlets 73 and 77. Since the piston rod 66 is held in a fixed position at 68, this will result in the exertion of a pressure force on the cylinder head 62 in a direction tending to move the cylinder 61 to the left as viewed in FIG. 5. Similarly, the displacement of the balance beam 86 upwardly at 87 will result in a pressure force on the cylinder head 63 in a direction tending to move the cylinder 61 to the right. As this description proceeds, it will become clear that the actual displacement of the balance beam 86 at 87 is an error signal proportional to the proper corrective force, upward movement being a positive error signal and downward movement being a negative error signal, and that the pressure forces acting on the cylinder heads 62 and 63 are, in fact, the proper corrective forces.

A yoke 90 is secured to the cylinder 61 by suitable fastening means 91 for movement with the cylinder, the right end of the yoke 90 being connected at 92 to a portion 23' of the mechanical connecting means 23 leading to the elevators 18. At the left end of the yoke 90, a link 93 is pivotally mounted to the yoke 90 at 94, and a portion 23" of the mechanical means 23 leading to the pilot's control stick 22 is pivotally connected to the link 93 at 95, the pivotal connections 94 and 95 being offset a small distance $d$. The upper end of the link 93 is pivotally connected to the balance beam 86 at 97, and the balance beam 86 is, in turn, pivotally connected to the yoke 90 at 98. The balance beam 86 is an elongated member having its pivot point 98 adjacent its left end at which a relatively large mass 110 is located, the moment exerted on the beam 86 by the mass 110 under normal acceleration being somewhat greater than the opposing moment exerted by the elongated beam 86 and its associated apparatus, including a smaller mass 111. Under normal acceleration, the beam 86 is biased to its illustrated null position by a double-acting spring assembly 112. The spring assembly 112 is adjustable to permit the right end 114 of the balance beam 86 to be aligned with an indicator 115 to assure that the beam 86 and the valve element 80 are in their null positions. More particularly, the spring assembly 112 includes a housing 120 located in a fixed position relative to the aircraft, a rod 121 pivotally connected to the balance beam 86 at 122, an adjusting wheel 123 mounted on a threaded portion 124 of the rod 121, and a pair of springs 125 and 126 compressed between opposite sides of the adjusting wheel 123 and the housing 120. By turning the adjusting wheel 123, the springs 125 and 126 can be selectively compressed to adjust the null position of the balance beam 86.

To limit the amount of movement of the balance beam 86 and the valve element 80, and consequently the maximum rate at which a corrective force can be applied by the actuator 60, a pair of screws 130 and 131 are located on opposite sides of the balance beam 86. To promote system stability by damping out minor fluctuations, an adjustable damper 133 is provided for limiting the rate at which the beam 86 moves. More particularly, the adjustable damper 133 includes a rod 135 pivotally connected to the beam 86 at 136, a plate 138 secured to the opposite end of the rod 135, a closed oil filled chamber 139 within which the plate 138 is disposed in tight sliding relation, and a conduit 140 interconnecting the chamber 139 on opposite sides of the plate 138 to permit fluid flow there-between. The conduit 140 includes an adjustable valve 142 for controlling the rate at which fluid can flow through the conduit 140 and, consequently, the rate at which the beam 86 can move.

An airspeed sensing assembly 150 is utilized to sense changes in airspeed from a trim speed. The assembly 150 includes a rod 151 pivotally connected to the beam 86 at 152, the opposite end of the rod 151 being secured to a plate 153 to which a diaphragm 154' is connected for separating an upper cavity 154 and an intermediate cavity 155 within a housing 156. The upper cavity 154 is pressurized with total pressure from a conventional aircraft pilot-static pressure measuring system, and the intermediate cavity 155 is pressurized with static pressure. A lower cavity 158 within the housing 156 is separated from the intermediate cavity 155 by a plate 160 and a diaphragm 161, and the two plates 153 and 160 are biased apart by a preload spring 163. The lower cavity 158 is pressurized with an incompressible fluid having a pressure equal to the total pressure at a given speed, and the assembly 150 is adjusted so that it exerts no force on the beam 86 at its connection 152 when the pressures within the upper and lower cavities 154 and 158 are the same. If, however, the airspeed increases, the pressure within the upper cavity 154 will increase, and this will compress the spring 163 and exert a downward force on the balance beam 86 which the pilot must oppose if the increased speed is to be held. Similarly, a decrease in airspeed will result in reduced pressure in the upper cavity 154, and the spring 163 will then cause an upward force to be exerted on the balance beam 86. To permit the maintenance of a changed trim speed without requiring the application of a pilot produced force, a trim element 170 is provided, the trim element 170 including a housing 171 having a diaphragm 172 therein dividing the interior of the housing into an upper cavity 174 and a lower cavity 175. The upper cavity 174 is pressurized with total pressure, and the lower cavity 175 is filled with an incompressible fluid such its pressure is the same as that of the upper cavity 174. A conduit 177 having a solenoid operated valve 178 therein connects the lower cavities 175 and 158, the valve 178 normally being closed. If, however, the pilot desires to operate at a new trim speed corresponding to his actual airspeed, he merely opens the valve 178 to permit the pressure to equalize in the two lower cavities 175 and 158.

Referring now to FIGURES 1, 2 and 5, it will be appreciated that the pilot control stick 22 and the elevator 18 are directly connected by a mechanical arrangement including the portions 23' and 23" and an intermediate linkage comprised of the yoke 90 and the link 93. Since the balance beam 86 can, of course, move between the limit screws 130 and 131, this intermediate linkage provides a small amount of play in the event that the force producing actuator 60 is inoperative. Actually, this play is so small, only a fraction of an inch at the most, that it is essentially unnoticeable to the pilot. If the actuator 60 is inoperative, this direct mechanical connection between the pilot's control stick 22 and the elevators 22 will permit the pilot to still control the piston of the elevators. This assures aircraft safety in the event of a failure in the control system.

As indicated above, the piston rod 66 is normally secured at 68 in a normally fixed position relative to the aircraft. Actually, this connection 68, which may be provided by means such as a preloaded spring or a slip clutch, is designed to yield at a predetermined force level so that the pilot can override the system by exerting forces on his control stick in excess of the predetermined force level. Thus, if desired, the pilot can directly and reversibly control the position of the elevators 18 by means of the direct mechanical linkage.

Referring now to FIGURES 4 and 5, let it again be assumed for illustrative purposes that the external and internal operating conditions are such that an actual force $F_A$ is exerted on the elevators 18 in a direction to raise their trailing edges 18'. As a result, the elevators 18 will exert a force $F_E$ on the yoke 90 directed to the left, and this force $F_E$ will be at least partially opposed by the actual pilot force $F_S$ acting on the link 93, which will tend to raise the right end of the balance beam 86 by exerting a moment proportional to the force $F_S$ on the beam 86. Simultaneously, normal acceleration, if any, acting on the mass 110 (which is larger than the total mass of the beam 86 to the right of the pivot point 98) will exert a moment proportional to the normal acceleration tending to raise (positive acceleration) or the lower (negative acceleration) the beam 86, a change in airspeed will exert a moment proportional to the change in airspeed tending to raise (decrease in airspeed) or lower (increase in airspeed) the beam 86, and angular pitch acceleration acting on entire mass of the beam 86 and its associated apparatus including the masses 110 and 111 will exert a moment proportional to the angular acceleration to raise (aircraft nose pitched up) or lower (aircraft nose pitched down) the beam 86. As a result of all of the moments acting on it, the beam 86 will assume an equilibrium position in which its displacement from its null position is proportional to the proper corrective force $F_C$. Of course, because of the dimensions of the beam 86, the forces and moments applied thereon will be quite small relative to the actual forces they represent. More particularly, the moment arms in the illustrated embodiment are such that the actual force $F_S$ produces a force 1/50 of its magnitude tending to raise the rod 84 at 87. If the net moments are such that the beam is displaced upwardly, the corrective force $F_C$ will be directed to the right, and if the net moments are such the beam is displaced downwardly, the corrective force $F_C$ will be directed to the left.

It will be appreciated from the foregoing that the control system of this invention optimizes the pilot produced stick forces required to position the elevators throughout a wide range of external operating conditions, the control system being substantially insensitive to internal aircraft conditions, including the location of the aircraft center of gravity.

It will occur to those skilled in the art that the control system of this invention can be used if desired to position, with optimum force characteristics, variable position elements other than aircraft control surfaces. For example, control systems of the type described herein may be utilized for positioning other members subject during the operation to variable forces resulting from external operating conditions, such members including the wheels of motor vehicles and the rudders of boats. Similarly, the invention may be utilized as a control system in arrangements for simulating the action of actual movable members under the influence of external operating parameters.

While a particular mechanical embodiment of the invention has been shown and described, it will be understood that various changes and modifications may be made without departing from the spirit and scope of the invention, and it is intended to cover all such changes and modifications by the appended claims.

What is claimed as new and is desired to secure by Letters Patent is:

1. An aircraft control system comprising:
   a variable position control surface subject to external loads during flight, a pilot operated control stick, mechanical means directly interconnecting said control stick and said control surface such that there is a direct and fully reversible relationship between the positions of said control stick and said control surface, and force producing and controlling means connected to said mechanical means for exerting a corrective force thereon, said force producing and controlling means sensing at least one external operating condition influencing the external loading on said control surface and the actual pilot produced force on said mechanical means, indicating a computed optimum pilot force corresponding to said operating condition, comparing the actual pilot produced force and the computed optimum pilot force, and generating a corrective force having a magnitude and direction such that the actual pilot produced force is substantially identical to the computed optimum pilot force.

2. An aircraft control system as defined by claim 1 in which said force producing and controlling means includes means for sensing normal acceleration of the aircraft.

3. An aircraft control system as defined by claim 2 in which said force producing and controlling means further includes means for sensing changes in airspeed.

4. An aircraft control system as defined by claim 2 in which said force producing and controlling means further includes means for sensing angular acceleration about the lateral axis of the aircraft.

5. An aircraft control system as defined by claim 2 in which said force producing and controlling means further includes means for limiting the rate at which the corrective force is applied.

6. An aircraft control system as defined by claim 1 in which said variable control surface is an elevator and in which said force producing and controlling means comprises:

force producing apparatus directly connected to said mechanical means for exerting the corrective force thereon, and a closed-loop servo control system connected to said force producing apparatus for continuously and instantaneously varying the direction and magnitude of the corrective force in accordance with the actual pilot produced force and the external operating condition influencing the external loading on said elevator.

7. An aircraft control system as defined by claim 6 in which said servo control system includes means for sensing normal acceleration of the aircraft, said means including at least one mass movable in response to normal acceleration.

8. An aircraft control system as defined by claim 7 in which said force producing apparatus is a double-acting fluid actuator comprising a closed cylinder and piston disposed within said cylinder for movement relative thereto, one of said cylinder and said piston being secured to said mechanical means and the ohter being secured in a fixed position relative to the aircraft, and in which said servo control system includes valve means for selectively controlling the flow of an actuating fluid to and from the opposite sides of said piston such that the proper corrective force is produced on said mechanical means by said actuator.

9. An aircraft control system as defined by claim 8 in which said servo control system further includes means for sensing changes in airspeed.

10. An aircraft control system as defined by claim 8 in which said servo control system further includes means for sensing angular acceleration about the lateral axis of the aircraft.

11. An aircraft control system as defined by claim 8 in which said servo control system further includes means for sensing both changes in airspeed and angular acceleration about the lateral axis of the aircraft.

12. An aircraft control system as defined by claim 8 in which the one of said cylinder and said piton located in a fixed position relative to the aircraft is secured by a connection which will yield upon the exertion thereon of a force of predetermined magnitude to permit movement of the actuator element relative to the aircraft, whereby the pilot may override said force producing and controlling means to independently control the position of said elevator.

13. An aircraft control system as defined by claim 8 in which said servo control system further comprises:

a linkage including a balance member mounted for movement through a predetermined range of positions, means biasing said balance member to a null position within said range of positions, means interconnecting said balance member and said valve means to position said valve means in accordance with the position of said balance member, said valve means controlling flow of fluid to said fluid actuator such that the corrective force exerted by said fluid actuator on said mechanical means is in a direction tending to lower the trailing edge of said elevator when said balance member is moved out of its null position in a first direction and in a direction tending to raise the trailing edge of said elevator when said balance member is moved out of its null position in a second direction, the magnitude of the corrective force being proportional to the displacement of said balance member from its null position, means responsive to at least one external operating condition influencing the external loading on said elevator, said condition responsive means exerting on said linkage forces tending to move said balance member in said first direction when the operating condition could be expected to exert aerodynamic forces tending to lower the trailing edge of said elevator and in said second direction when the operating condition could be expected to exert forces tending to raise the trailing edge of said elevator, the magnitude of the effect of a given external condition on said balance member being proportional to the optimum pilot force corresponding to the given condition, and means interconnecting said mechanical means and said linkage for exerting on said linkage forces tending to move said balance member in said first direction when the actual pilot produced force is tending to lower the trailing edge of said elevator and in said second direction when the actual pilot produced force on said control surface is tending to raise the trailing edge of said elevator, the magnitude of the effect of the actual pilot produced force on said balance member being proportional to the actual pilot produced force, the balance member assuming an equilibrium position in which the net effect thereon of said external operating condition responsive means and said interconnecting means is balanced by said biasing means, the displacement of said balance member from its null position being proportional to a required corrective force, whereby a proper corrective force is exerted on said mechanical means by said fluid actuator.

14. An aircraft control system as defined by claim 13 in which said balance member is a substantially horizontal beam pivotally mounted about an axis extending laterally of the aircraft, and in which said condition responsive means includes means having mass associated with said balance beam for exerting moments thereon in the presence of normal acceleration.

15. An aircraft control system as defined by claim 14 in which said condition responsive means further includes airspeed sensing means responsive to changes in dynamic pressure for exerting moments on said balance beam in accordance with such changes, said pressure sensing means further including means for trimming its moment output to zero at any given airspeed.

16. An aircraft control system as defined by claim 15 further including damping means for limiting the rate of movement of said balance beam and stop means for limiting the displacement of said balance beam.

17. An aircraft control system as defined by claim 16 in which said external operating condition responsive means further includes means having mass associated with said balance beam for exerting moments thereon in the presence of angular acceleration about the lateral axis of the aircraft.

18. An aircraft control system as defined by claim 17 in which the one of said cylinder and said piston located in a fixed position relative to the aircraft is secured by a connecton which will yield upon the exertion thereon of a force of predetermined magnitude to permit movement of the actuator element relative to the aircraft, whereby the pilot may override said force producing and controlling means to independently control the position of said elevator.

19. A control system comprising:
   a variable position member subject to external loads during operation.
   a control member,
   mechanical means directly interconnecting said control member and said variable position member such that there is a direct and fully reversible relationship between the positions of said members,
   and force producing and controlling means connected to said mechanical means for exerting a corrective force thereon,
   said force producing and controlling means sensing at least one external operating condition influencing the external loading on said variable position member and the actual force exerted on said mechanical means to position said variable position member, indicating a computed optimum positioning force corresponding to said operating condition, comparing the actual positioning force and the computed optimum positioning force, and generating a corrective force having a magnitude and direction such that the actual positioning force is substantially identical to the computed optimum positioning force.

References Cited

UNITED STATES PATENTS

| 3,303,715 | 2/1967 | Zimer | 244—83 XR |
| 3,395,878 | 8/1968 | Westburg | 244—83 |

ANDREW H. FARRELL, Primary Examiner